United States Patent
Oh et al.

(10) Patent No.: US 10,827,424 B2
(45) Date of Patent: Nov. 3, 2020

(54) MOBILE TERMINAL AND METHOD FOR CONTROLLING THE SAME

(71) Applicant: LG ELECTRONICS INC., Seoul (KR)

(72) Inventors: Seungkeun Oh, Seoul (KR); Junsu Park, Seoul (KR); Jehyun Baek, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/204,687

(22) Filed: Nov. 29, 2018

(65) Prior Publication Data

US 2019/0357139 A1 Nov. 21, 2019

(30) Foreign Application Priority Data

May 18, 2018 (KR) .................. 10-2018-0057385

(51) Int. Cl.
| | | |
|---|---|---|
| *G06F 13/16* | (2006.01) | |
| *H04W 52/02* | (2009.01) | |
| *H04W 56/00* | (2009.01) | |

(52) U.S. Cl.
CPC ....... *H04W 52/0209* (2013.01); *H04W 56/00* (2013.01); *G06F 13/1689* (2013.01)

(58) Field of Classification Search
CPC .... H04W 16/10; H04W 24/02; B64C 39/024; B64C 2201/126
See application file for complete search history.

(56) References Cited

U.S. PATENT DOCUMENTS

| 9,357,555 B2 | 5/2016 | Kim et al. |
| 2006/0187226 A1 | 8/2006 | Bruno et al. |
| 2011/0276817 A1 | 11/2011 | Fullerton et al. |
| (Continued) | | |

FOREIGN PATENT DOCUMENTS

KR  1020120079090  7/2012

OTHER PUBLICATIONS

PCT International Application No. PCT/KR2018/015855, Notification of Transmittal of the International Search Report and the Written Opinion of the International Searching Authority, or Declaration dated Mar. 26, 2019, 12 pages.

*Primary Examiner* — Brian R Peugh
(74) *Attorney, Agent, or Firm* — Lee, Hong, Degerman, Kang & Waimey PC

(57) ABSTRACT

The present disclosure relates to a mobile terminal in which a clock frequency of a memory varies as needed and a control method thereof, and the mobile terminal may include a memory provided with a table comprising information on a memory clock frequency corresponding to a different multiple of a preset source clock frequency, and a controller configured to primarily change the memory clock frequency of the mobile terminal to any one of frequencies according to the table in accordance with at least one of functions or applications carried out in the mobile terminal, wherein when the memory clock frequency is primarily changed, the controller secondarily changes the changed memory clock frequency to a frequency different from the changed memory clock frequency according to whether or not the communication performance of the mobile terminal is degraded.

20 Claims, 4 Drawing Sheets

(56) References Cited

U.S. PATENT DOCUMENTS

| 2012/0159230 | A1* | 6/2012 | Chen | G06F 1/08 |
| | | | | 713/600 |
| 2013/0166832 | A1 | 6/2013 | Peng et al. | |
| 2018/0074743 | A1* | 3/2018 | Jeter | G06F 1/08 |

* cited by examiner

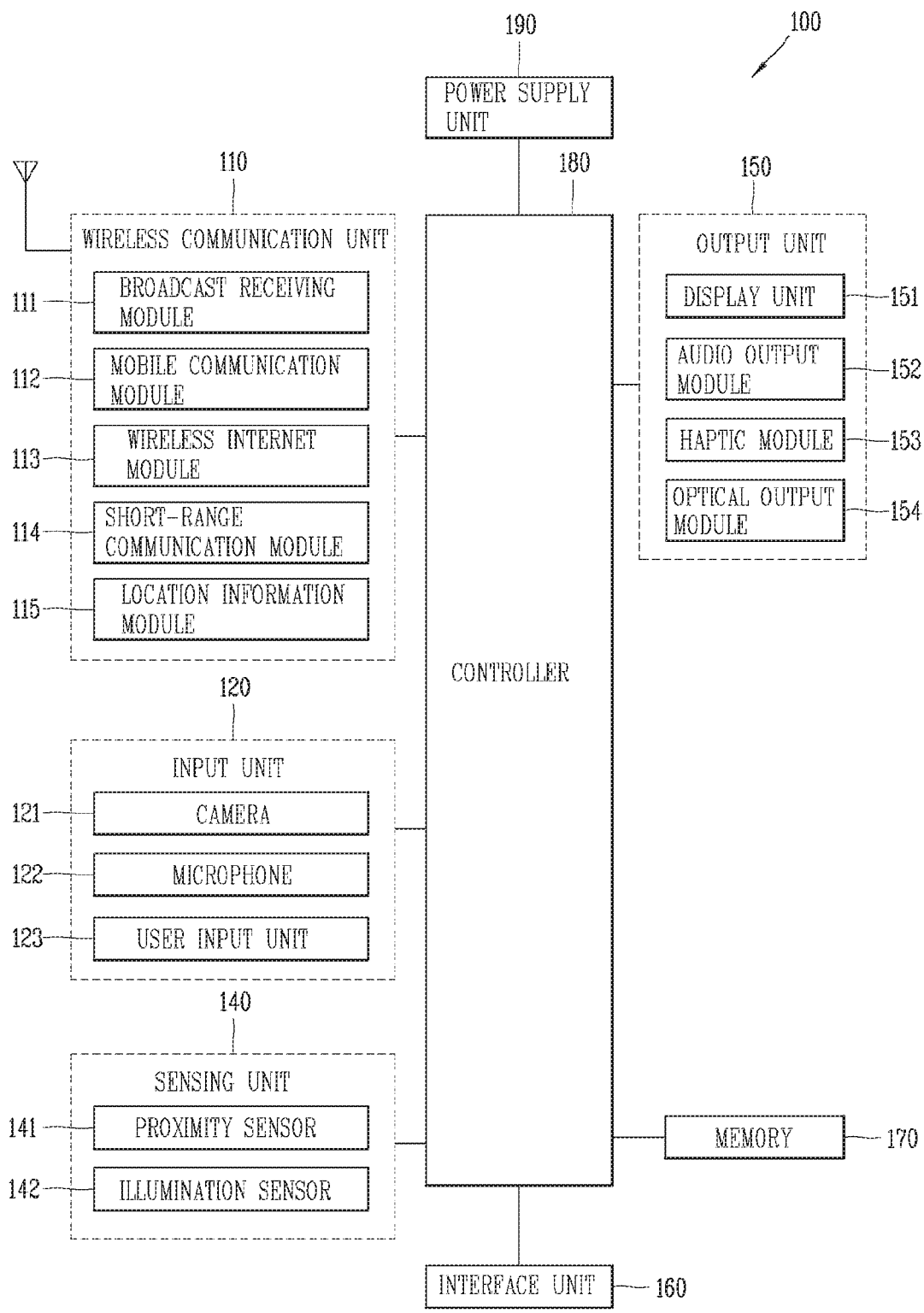

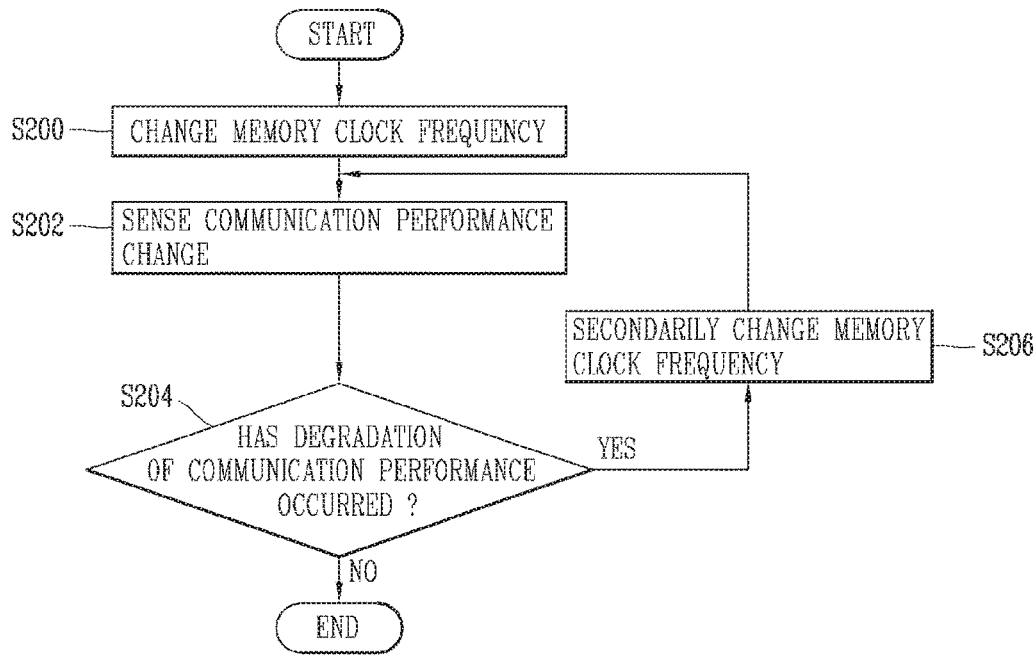
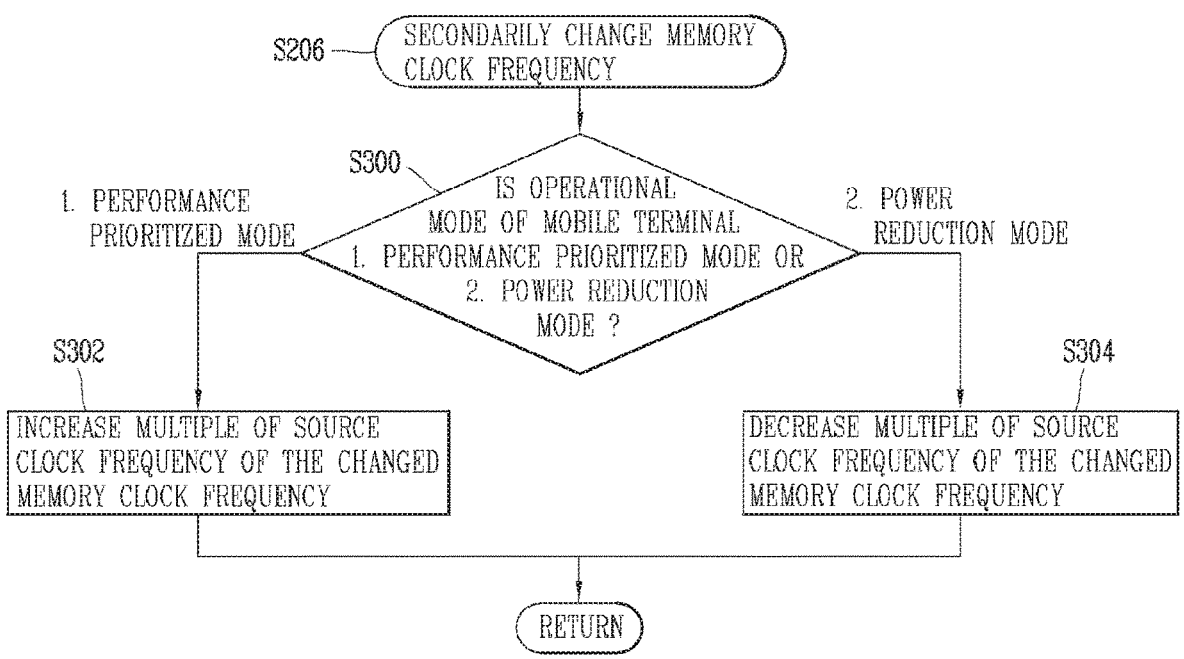

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2018-0057385, filed on May 18, 2018, the contents of which are hereby incorporated by reference herein in its entirety.

BACKGROUND OF THE INVENTION

1. Field of the Invention

The present disclosure relates to a mobile terminal in which a clock frequency of a memory varies as needed and a control method thereof.

2. Description of the Conventional Art

Terminals may be classified into mobile/portable terminals and stationary terminals according to their mobility. Furthermore, mobile terminals may be divided into hand-held terminals and vehicle mounted terminals according to whether or not it can be directly carried by a user.

The functions of mobile terminals have been diversified. For example, the functions may include data and voice communication, photographing and video shooting through a camera, voice recording, playing a music file through a speaker system, and displaying an image or video on a display unit. Some terminals further include an electronic game play function or perform a multimedia player function. In particular, in recent years, mobile terminals may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player. In order to support and enhance the functions of the terminal, the improvement of structural or software elements of the terminal may be taken into consideration.

On the other hand, as the terminal has enhanced to a high-performance device having complex functions, various studies have been made to use the limited power of the terminal as efficiently as possible. As a result of such studies, a method of varying a clock frequency for communication with the memory according to a function performed in the terminal has emerged. This method is advantageous in that the controller of the terminal increases or decreases the clock frequency of the memory as needed to more efficiently manage power required for communication with the memory.

However, in case of the foregoing method, when a multiplication frequency of the memory clock frequency overlaps with a frequency band used in a communication channel of the terminal, there is a problem that the wireless communication performance of the terminal is degraded due to the clock frequency for communication with the memory. In other words, since frequencies used by each other are close to each other by a predetermined level or more, interference may occur between them, and accordingly, a signal of frequency used for communication with the memory may be noise for a radio signal transmitted and received by the terminal.

Therefore, studies on a method for preventing the degradation of communication performance of the terminal due to the clock frequency of the memory while having an advantage of varying the clock frequency of the memory have been actively carried out.

SUMMARY OF THE INVENTION

An object of the present disclosure is to solve the foregoing problems and other problems, and the objective of the present disclosure is to provide a mobile terminal capable of preventing the degradation of terminal communication performance according to a changed memory clock frequency and a control method thereof.

In order to accomplish the foregoing or other objects, according to an aspect of the present disclosure, a mobile terminal according to an embodiment of the present disclosure may include a memory provided with a table comprising information on a memory clock frequency corresponding to a different multiple of a preset source clock frequency, and a controller configured to primarily change the memory clock frequency of the mobile terminal to any one of frequencies according to the table in accordance with at least one of functions or applications carried out in the mobile terminal, wherein when the memory clock frequency is primarily changed, the controller secondarily changes the changed memory clock frequency to a frequency different from the changed memory clock frequency according to whether or not the communication performance of the mobile terminal is degraded.

According to an embodiment, the controller may increase or decrease the changed memory clock frequency by a frequency corresponding to a preset multiple of the source clock frequency to secondarily change the memory clock frequency.

According to an embodiment, the controller may increase or decrease the changed memory clock frequency based on whether an operational mode of the mobile terminal is an operational mode that prioritizes performance or an operational mode that prioritizes power consumption reduction during a secondary change of the memory clock frequency.

According to an embodiment, the controller may decrease the changed memory clock frequency during the secondary change of the memory clock frequency when the remaining power of the mobile terminal is less than a preset level.

According to an embodiment, the controller may determine again whether or not the communication performance of the mobile terminal has been degraded by the changed memory clock frequency when the memory clock frequency is secondarily changed, and perform again the secondary change of the memory clock frequency according to a result of being determined again.

According to an embodiment, when a secondary change for the memory clock frequency is carried out again more than a preset number of times, the controller may vary a frequency change width to be changed during the secondary change.

According to an embodiment, the controller may increase or decrease the primarily changed memory clock frequency by a different multiple of the source clock frequency corresponding to a number of times the secondary change is carried out to perform the secondary change of the memory clock frequency.

According to an embodiment, when the memory clock frequency is primarily changed, the controller may acquire information on a communication frequency band used by the mobile terminal, and determine whether or not the communication performance is degraded according to whether or not a frequency corresponding to a multiplication of the primarily changed memory clock frequency is included in the communication frequency band, and perform a secondary change of the memory clock frequency.

According to an embodiment, the controller may determine whether or not the communication performance is degraded when a frequency corresponding to a multiplication of the primarily changed memory clock frequency is included in the communication frequency band, and maintain the primarily changed memory clock frequency when it is determined that the communication performance is not degraded.

According to an embodiment, the degradation of the communication performance may be determined through a change in at least one of a wireless signal reception sensitivity of the mobile terminal and a signal-to-noise ratio detected from a wireless communication unit of the mobile terminal after the memory clock frequency is changed.

In order to accomplish the foregoing and other objects, according to an aspect of the present disclosure, a method for controlling a mobile terminal according to an embodiment of the present disclosure may include a first step of primarily changing the memory clock frequency according to at least one of functions or applications carried out in the mobile terminal, a second step of determining whether or not the communication performance of the mobile terminal has been degraded after the memory clock frequency is changed, a third step of maintaining the changed memory clock frequency or secondarily changing the primarily changed memory clock frequency to a frequency different from the changed memory clock frequency according to a determination result of the second step, and a fourth step of repeating the second to third steps when the memory clock frequency is secondarily changed, wherein the frequency different from the changed memory clock frequency is a frequency increased or decreased by a frequency corresponding to a preset multiple of a preset source clock frequency from the changed memory clock frequency.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram for explaining a mobile terminal associated with the present disclosure;

FIG. 2 is a flowchart illustrating an operational process of secondarily changing a primarily changed memory clock frequency according to whether or not a degradation of communication performance occurs in a mobile terminal related to the present disclosure;

FIG. 3 is a flowchart more specifically illustrating the process of changing a memory clock frequency during the operational operation of FIG. 2;

DETAILED DESCRIPTION OF THE PREFERRED EMBODIMENT

Figure 4:
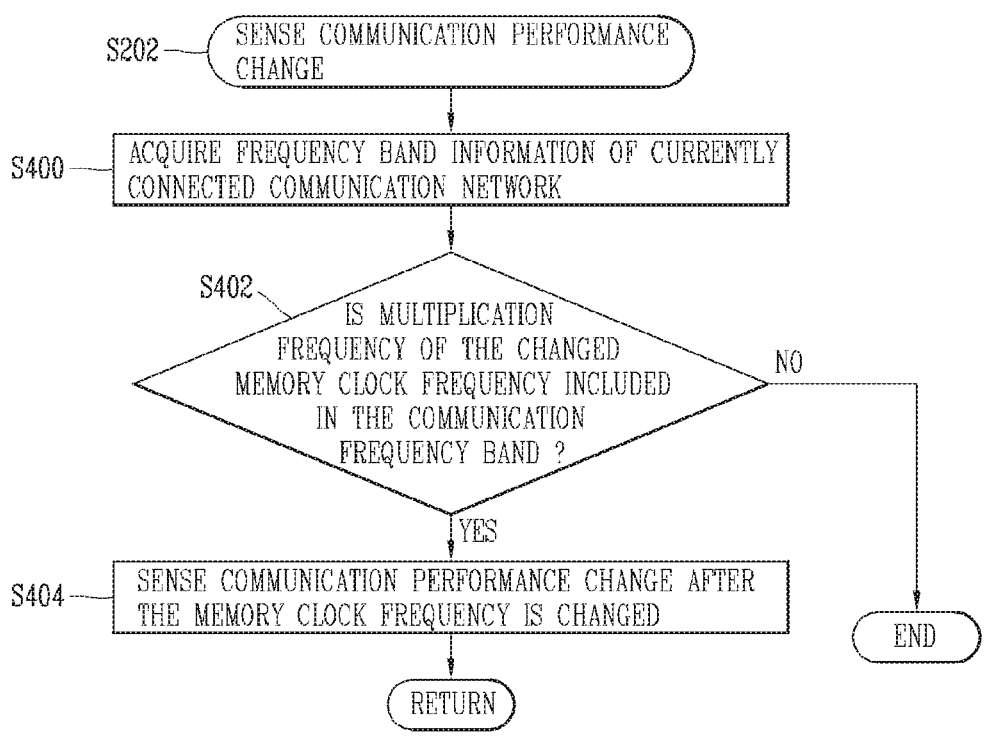
FIG. 4 is a flowchart illustrating an operational process of allowing a mobile terminal according to an embodiment of the present disclosure to sense whether or not the communication performance of the terminal is degraded according to a frequency band of a currently connected communication network.

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Referring to FIG. 1, FIG. 1 is a block diagram for explaining a mobile terminal associated with the present disclosure.

The controller 180 may include a wireless communication unit 110, an input unit 120, a sensing unit 140, an output unit 150, an interface unit 160, a memory 170, a controller 180, a power supply unit 190, and the like. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

In more detail, the wireless communication unit 110 of those components may typically include one or more modules allowing wireless communications between the controller 180 and a wireless communication system, between the controllerl 80 and another mobile terminal, or between the controller 180 and an external server. In addition, the wireless communication unit 110 may include one or more modules for connecting the controller 180 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the controller 180 and a user, as well as functioning as the user input unit 123 which provides an input interface between the controller 180 and the user.

The interface unit 160 serves as an interface with various types of external devices connected to the controller 180. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The controller 180 may perform an appropriate control associated with a connected external device, in response to the external device being connected to the interface unit 160.

In addition, the memory 170 stores data that support various functions of the controller 180. The memory 170 is typically implemented to store data to support various functions or features of the controller 180. For instance, the memory 170 may be configured to store application programs executed in the controller 180, data or instructions for operations of the mobile terminal 100, and the like. At least some of those application programs may be downloaded from an external server via wireless communication. Some others of those application programs may be installed within the controller 180 at the time of being shipped for basic functions of the controller 180 (for example, receiving a call, placing a call, receiving a message, sending a message, etc.). On the other hand, the application programs may be stored in the memory 170, installed in the controller 180, and executed by the controller 180 to perform an operation (or a function) of the mobile terminal 100.

The controller 180 may typically control an overall operation of the controller 180 in addition to the operations associated with the application programs. The controller 180 may provide or process information or functions appropriate for a user by processing signals, data, information and the like, which are input or output by the various components depicted in FIG. 1A, or activating application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the controller 180 for operation.

The power supply unit 190 may receive external power or internal power and supply appropriate power required for operating respective elements and components included in the terminal 180 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the controller 180 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable mobile terminal 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the controller 180. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the controller 180 and a wireless communication system, between the controller 180 and another mobile terminal, or between the controller 180 and a network where another mobile terminal (or an external server) is located, via a wireless personal area network. The short-range communication module 114 denotes a module for short-range communications.

In some embodiments, another controller 180 may be a wearable device, for example, a smart watch, a smart glass or a head mounted display (HMD), which is able to exchange data with the controller 180 (or otherwise cooperate with the controller 180). The short-range communication module 114 may sense (recognize) a wearable device, which is able to communicate with the controller 180, near the controller 180. In addition, when the sensed wearable device is a device which is authenticated to communicate with the controller 180 according to the present disclosure, the controller 180 may transmit at least part of data processed in the controller 180 to the wearable device via the short-range communication module 114. Hence a user of the wearable device may use the data processed in the controller 180 on the wearable device. For example, when a call is received in the controller 180, the user may answer the call using the wearable device. Also, when a message is received in the controller 180, the user can check the received message using the wearable device.

The location information module 115 is generally configured to detect, calculate, derive or otherwise identify a position of the mobile terminal. As an example, the location information module 115 includes a Global Position System (GPS) module, a WiFi module, or both. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Next, the input unit 120 may be configured to provide an audio or video signal (or information) input to the electronic device or information input by a user to the electronic device. For the input of the audio information, the controller 180 may include one or a plurality of cameras 121. The camera 121 processes a image frame, such as still picture or video, acquired by an image sensor in a video phone call or image capturing mode. The processed image frames may be displayed on the display unit 151. On the other hand, the plurality of cameras 121 disposed in the controller 180 may be arranged in a matrix configuration. By use of the cameras 121 having the matrix configuration, a plurality of image information having various angles or focal points may be input into the controller 180. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the controller 180 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the controller 180 to correspond to the input information. The user input unit 123 may include a mechanical input element (or a mechanical key, for example, a button, a dome switch, a jog wheel, a jog switch or the like located on a front/rear surface or a side surface of the controller 180), and a touch-sensitive input element. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the controller 180 or execute data processing, a function or an operation associated with an application program installed in the mobile terminal 100 based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the controller 180 to execute different operations or process different data (or information) according to whether a touch with respect to the same point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the controller 180 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. On the other hands, the controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor (or image sensor) and a laser sensor.

Implementing the camera 121 with a laser sensor may allow detection of a touch of a physical object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may display (output) information processed in the controller 180. For example, the display unit 151 may display execution screen information of an application program driven in the controller 180 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output unit 152 may also provide audible output signals related to a particular function (e.g., a call signal reception sound, a message reception sound, etc.) performed by the controller 180. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. The haptic module 153 may be implemented in two or more in number according to the configuration of the controller 180.

An optical output module 154 may output a signal for indicating an event generation using the light of a light source of the controller 180. Examples of events generated in the controller 180 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the controller 180. The interface unit 160 may allow a data reception from an external device, a power delivery to each component in the controller 180, or a data transmission from the controller 180 to an external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

On the other hand, the identification module may be configured as a chip for storing various information required to authenticate an authority to use the controller 180, which may include a User Identity Module (UIM), a Subscriber Identity Module (SIM), and the like. In addition, the device having the identification module (also referred to herein as an "identification device") may take the form of a smart card. Accordingly, the identifying device may be connected with the terminal 100 via the interface unit 160.

The interface unit 160 may serve as a path for power to be supplied from an external cradle to the controller 180 when the controller 180 is connected to the external cradle or as a path for transferring various command signals inputted from the cradle by a user to the controller 180. Such various command signals or power inputted from the cradle may operate as signals for recognizing that the controller 180 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the controller 180 may operate in association with a web storage which performs the storage function of the memory 170 on the Internet.

As aforementioned, the controller 180 may typically control the general operations of the controller 180. For example, the controller 180 may set or release a locked state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the controller 180.

The power supply unit 190 may receive external power or internal power and supply appropriate power required for operating respective elements and components under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Hereinafter, embodiments associated with a control method which can be implemented in the mobile terminal having the foregoing configuration will be described with reference to the attached drawings. It should be understood by those skilled in the art that the present disclosure can be embodied in other specific forms without departing from the concept and essential characteristics thereof.

First, FIG. 2 is a flowchart illustrating an operational process of secondarily changing a primarily changed memory clock frequency according to whether or not a degradation of communication performance occurs in a mobile terminal related to the present disclosure.

Referring to FIG. 2, the controller 180 of the mobile terminal 100 according to the embodiment of the present disclosure may change a memory clock frequency according to a current operation mode of the mobile terminal 100 or a function or application currently being performed (S200).

For example, the controller 180 may control the clock generator IC (not shown) to change the memory clock frequency. Alternatively, the controller 180 may control a multiple of the source clock frequency. In this case, the memory source clock frequency can be changed according to the controlled multiple of source clock frequency.

For an example, the controller 180 may change the memory clock frequency to a frequency lower than a currently set memory clock frequency when the current operation mode is a power saving mode, or the number of functions or applications currently being performed is less than a predetermined number.

On the contrary, when the current operation mode is a high performance mode, a performance-oriented mode such as a game mode, or the number of currently performed functions or applications exceeds a predetermined number, the memory clock frequency may be changed to a frequency higher than the currently set memory clock frequency.

Here, the memory clock frequency may be determined according to a preset multiple of the memory source clock frequency. In other words, when the controller 180 changes the memory clock frequency in the step S200, the controller 180 may change the memory clock frequency to a frequency corresponding to another preset multiple of the source clock frequency. To this end, the memory 170 may store a preset different multiple of the source clock frequency and memory clock frequency information corresponding thereto in a table (memory clock frequency table). The table below shows an example of the memory clock frequency table when the source clock frequency is 10 MHz.

TABLE

| Class | MULTIPLE OF SOURCE CLOCK FREQUENCY | MEMORY CLOCK FREQUENCY |
|---|---|---|
| 0 | ×2 | 20 MHz |
| 1 | ×11 | 110 MHz |
| 2 | ×21 | 210 MHz |
| 3 | ×28 | 280 MHz |
| 4 | ×39 | 390 MHz |
| 5 | ×56 | 560 MHz |
| 6 | ×66 | 660 MHz |
| 7 | ×75 | 750 MHz |
| 8 | ×81 | 810 MHz |
| 9 | ×93 | 930 MHz |

In case where there is a memory clock table as shown in the above table, the controller 180 determines whether or not the current mobile terminal 100 or the memory clock frequency according to at least one function or application currently being performed when the memory clock frequency currently being set is 750 MHz (Class 7, 75 times the source clock frequency 10 MHz).

For example, when at least one of the functions currently being performed is terminated, the controller 180 may determine that the amount of information to be loaded from the memory 170 is reduced. Furthermore, the memory clock frequency may be changed to a lower multiple of the memory clock frequency, for example, a frequency corresponding to 660 MHz (Class 6, 66 times the source clock frequency (10 MHz)) in the above table.

On the contrary, when at least one function is further performed in addition to the functions currently being performed, or when at least one of the functions currently being performed requires more data, the controller 180 may determine that the amount of information to be loaded from the memory 170 is increased. Furthermore, the memory clock frequency may be changed to a higher multiple of the memory clock frequency, for example, a frequency corresponding to 810 MHz (Class 8, 81 times the source clock frequency (10 MHz)) in the above table.

On the other hand, when the memory clock frequency is changed as described above, a frequency corresponding to a multiplication of the changed memory clock frequency may be included in a frequency band used in the communication network. In this case, a communication signal between the memory 170 and the controller 180 carried out according to the memory clock frequency may interfere with a signal transmitted and received to and from a communication network to act as a noise to the signal transmitted and received to and from the communication network. Furthermore, when the noise, that is, noise inside the circuit, occurs, the communication performance of the mobile terminal 100 may be degraded.

However, even when a frequency corresponding to the multiplication of the memory clock frequency is included in a frequency band used in the communication network, there may be only a possibility that the interference occurs, but the interference phenomenon may of course not actually occur. For example, even when a frequency corresponding to the multiplication of the memory clock frequency is included in a frequency used in the communication network, in case where a frequency used by the mobile terminal 100 for actual communication differs from the memory clock frequency by more than a preset level or the degradation of communication performance due to the interference phenomenon is at an extremely small level (for example, less than a preset level) even if there is, it may of course be determined that the interference phenomenon by the memory clock frequency does not occur.

On the other hand, as shown in the above table, a changeable memory clock frequency is set in advance. These preset memory clock frequencies are determined based on the results of a plurality of experiments related to the memory 170 to operate most efficiently in each case. Accordingly, when the predetermined memory clock frequency as shown in the above table is not used, there is a problem that the efficiency is reduced as compared with the case where the predetermined clock frequency is used.

Therefore, according to the present disclosure, when the memory clock frequency is changed, the memory clock frequency may be changed again based on whether or not an interference phenomenon actually occurs, thereby using the memory clock frequency according to a preset multiple as it is when the communication performance is not actually reduced.

To this end, when a variation of the memory clock frequency is made in the step S200, the controller 180 of the mobile terminal 100 according to an embodiment of the present disclosure may sense a change of communication performance of the mobile terminal 100 since the time when the variation has been made (S202).

Here, the communication performance of the mobile terminal 100 may be sensed in various forms. For example, the communication performance may be determined by a change in reception sensitivity or signal-to-noise ratio of a wireless signal sensed through the wireless communication unit 110. Accordingly, when the reception sensitivity of the wireless signal changes above a preset level since the memory clock frequency is varied, or when the signal-to-noise ratio detected by the wireless communication unit 110 changes above a preset level, the controller 180 may sense that the communication performance of the mobile terminal 100 is changed since the clock frequency is varied.

Furthermore, the controller 180 may determine whether or not the communication performance of the mobile terminal 100 is degraded based on the sensing result of the step S202 (S204).

For example, when at least one of the reception sensitivity and the signal-to-noise ratio of the wireless signal falls below a preset level or at least one of the reception sensitivity or the signal-to-noise ratio of the wireless signal is detected to be less than a preset threshold value, it may be determined that the communication performance of the mobile terminal 100 is degraded. In addition, the degradation of the communication performance may be determined as degradation due to a change of the memory clock frequency.

For example, as described above, when changed to the memory clock frequency (810 MHz, 81 times the source clock frequency) corresponding to Class 8 in the above table, the triple frequency may be 2,430 MHz.

Meanwhile, when the mobile terminal 100 is connected to a WiFi communication network, the WiFi frequency band is from 2,402 MHz to 2,484 MHz, and thus the triple frequency (2,430 MHz) of the memory clock frequency may be included in the frequencies of the WiFi frequency band. In this case, when a frequency actually used by the mobile terminal 100 during communication is sufficiently close to the memory clock frequency, an interference phenomenon due to an interaction between frequencies may occur. Moreover, the degradation of the communication performance of the mobile terminal 100 such as a decrease in the reception sensitivity or a decrease in the signal-to-noise ratio due to the interference phenomenon may occur.

On the contrary, even when the triple frequency (2,430 MHz) of the memory clock frequency is included in the frequency of the WiFi frequency band, an interference phenomenon due to the interaction may not occur in case where a frequency used by the mobile terminal 100 during communication is sufficiently different from the memory clock frequency. Therefore, the degradation of communication performance of the mobile terminal 100 such as a decrease in the reception sensitivity or a decrease in the signal-to-noise ratio may not occur, and when the degradation of communication performance does not occur, the controller 180 may maintain the current memory clock frequency as it is without secondarily changing the memory clock frequency.

On the other hand, when the degradation of communication performance has occurred as a result of the determination in the step S204, the controller 180 may secondarily change the memory clock frequency (S206).

Here, a secondary change of the memory clock frequency may be made through a dynamic change that increases or decreases a multiple of the source clock frequency corresponding to the currently changed memory clock frequency by a predetermined multiple.

For example, when the predetermined multiple is "1", the controller 180 may increase or decrease the multiple of the source clock frequency by "1" in a state where the currently changed memory clock frequency, that is, 810 MHz, is set to 81 times the source clock frequency (10 MHz). Therefore, when the secondary change is made, the memory clock frequency may be changed to 800 MHz, which is 80 times the source clock frequency (10 MHz), or 820 MHz, which is 82 times the source clock frequency (10 MHz).

Furthermore, when the memory clock frequency is secondarily changed through the step S206, the controller 180 may proceed to the step S202 to sense the communication performance of the mobile terminal 100 again after the memory clock frequency is secondarily changed. Furthermore, the process proceeds to step S204 to determine whether or not the degradation of communication performance has occurred according to the sensing result in the step S202. In addition, according to the determination result, the controller may terminate a current operation process to maintain the current memory clock frequency (secondarily changed memory clock frequency), or proceed again to the step S206 to secondarily change the memory clock frequency again. In this case, the steps S202 and S204 may be carried out again.

As described above, according to the present disclosure, when the memory clock frequency is changed, it is determined whether or not the degradation of communication performance has occurred by the changed memory clock frequency, and the memory clock frequency may be changed again according to the determination result. In other words, according to the present disclosure, the memory clock frequency may not be changed according to the information of a frequency band currently used by the mobile terminal 100 in a communication network, but changed according to whether or not the actual communication performance is degraded, and thus the memory clock frequency may be changed without using the information of the communication frequency band used by the mobile terminal 100.

FIG. 3 is a flowchart more specifically illustrating the process of changing a memory clock frequency during the operational operation of FIG. 2.

First, since the number of times the controller 180 accesses the memory 170 for a predetermined period of time increases when the memory clock frequency increases, the amount of data read from the memory 170 may increase, but the power consumption may also be increased by that amount. On the contrary, since the number of times the controller 180 accesses the memory 170 for a predetermined period of time decreases when the memory clock frequency decreases, the amount of data read from the memory 170 may increase, but the power consumption may also be decreased by that amount.

Accordingly, the controller 180 may increase the memory clock frequency during the secondary change when an operation mode that prioritizes performance such as a high performance mode or a game mode, and decrease the memory clock frequency during thin the mobile terminal 100 is a mode that prioritizes power consumption reduction such as a power saving mode.

Therefore, when the step S206 of secondarily changing the memory clock frequency is started, the controller 180 may increase or decrease the memory clock frequency according to an operation mode of the mobile terminal to secondarily change the memory clock frequency (S300).

First, when the operation mode set in the mobile terminal 100 is a mode that prioritizes performance, the controller 180 may increase the multiple of the source clock frequency of the memory clock frequency by a predetermined multiple during the secondary change (S302).

Then, in case where the memory clock frequency changed in the step S200 of FIG. 2 is 810 MHz (81 times the source clock frequency (10 MHz)), when the predetermined multiple is "1", the controller 180 may increase the source clock frequency currently set to 81 times in the step S302 to 82 times increased by a factor of "1". Therefore, as a result of the step S302, the memory clock frequency may be increased to 820 MHz. Then, the controller 180 proceeds to the step S202 of FIG. 2 to sense the communication performance of the mobile terminal 100, and determine whether or not the degradation of communication performance according to the increased memory clock frequency 820 MHz has occurred.

On the contrary, when the operation mode set in the mobile terminal 100 is a mode that prioritizes power consumption reduction, the controller 180 may increase the multiple of the source clock frequency of the memory clock frequency by a predetermined multiple during the secondary change (S304).

As shown in the foregoing example, in case where the currently changed memory clock frequency is 810 MHz (81 times the source clock frequency (10 MHz)), when the predetermined multiple is "1", the controller 180 may increase the source clock frequency currently set to 81 times in the step S304 to 80 times decreased by a factor of "1". Therefore, as a result of the step S304, the memory clock frequency may be decreased to 800 MHz. Then, the controller 180 proceeds to the step S202 of FIG. 2 to sense the communication performance of the mobile terminal 100, and determine whether or not the degradation of communication performance according to the increased memory clock frequency 800 MHz has occurred.

On the other hand, in the foregoing description, an example in which an increase (S302) or decrease (S304) of the multiple is determined during the secondary change of the memory clock frequency according to the operation mode of the mobile terminal 100 in the step S300 has been described, but the increase or decrease of the multiple may of course be determined according to the power state of the mobile terminal 100.

For an example, even though the currently set operation mode is a mode that prioritizes performance, when the remaining power of the battery is less than a predetermined level, the controller 180 may of course proceed to the step S304 to decrease the memory clock frequency. In other words, when the remaining power of the battery is lower than a predetermined level, the controller 180 may automatically proceed to a mode that prioritizes power consumption reduction, thereby reducing the clock frequency of the memory during the secondary change. Accordingly, the controller 180 of the mobile terminal 100 according to an embodiment of the present disclosure may change or decrease the clock frequency of the memory during the secondary change based on the currently set operation mode of the mobile terminal 100 or the state of the mobile terminal 100.

Meanwhile, in the description of FIG. 3, a case where the multiple increased or decreased during the secondary change is "1" has been described as an example, but the multiple may of course be changed according to a number of times the memory clock frequency is secondarily changed.

As described above, when the memory clock frequency is secondarily changed, the controller 180 of the mobile terminal 100 according to an embodiment of the present disclosure may determine whether or not the degradation of communication performance has occurred according to the secondarily changed memory clock frequency, and secondarily change the memory clock frequency again when the degradation of communication performance has occurred. Therefore, the secondary change of the memory clock frequency may occur a plurality of times depending on whether or not the communication performance is degraded.

In this case, the controller 180 may increase or decrease the memory clock frequency by a frequency corresponding to a predetermined multiple of the source clock frequency until the secondary change is carried out a preset number of times. However, when the secondary change is repeated more than a preset number of times, the controller 180 may of course change the increased or decreased multiple of the source clock frequency so as to be increased or decreased to a larger extent.

For an example, when the predetermined multiple is "1", the controller 180 may increase or decrease the memory clock frequency changed in the step S200 of FIG. 2 by a factor of "1" of the source clock frequency (10 MHz), that is, 10 MHz, in the step S302 or S304. However, when the secondary change process is carried out more than a predetermined number of times, the controller 180 may increase the source clock frequency (10 MHz) by a factor of two. In this case, in step S302 or S304, the controller 180 may increase or decrease the memory clock frequency by twice the source clock frequency (10 MHz), that is, 20 MHz.

Meanwhile, in the above description, an example in which the memory clock frequency changed according to the operational mode or the state of the mobile terminal 100 is continuously increased or decreased to secondarily change the memory clock frequency has been described, but on the contrary, the memory clock frequency may of course be alternately increased or decreased once.

In this case, the controller 180 may alternately increase or decrease the memory clock frequency by a frequency corresponding to a different multiple of the source clock frequency based on the number of times the secondary change is carried out to perform the secondary change of the memory clock frequency. In other words, when the secondary change is initially carried out, the controller 180 may first increase the memory clock frequency changed in the step S200 by a frequency (10 MHz) corresponding to one times the source clock frequency to perform the secondary change (the secondarily changed memory clock frequency: 820 MHz). Furthermore, when the secondary change is resumed through the steps S202 and S204 of FIG. 2, the memory clock frequency changed in the step S200 may be decreased by a frequency (10 MHz) corresponding to one times the source clock frequency to perform the secondary change (the secondarily changed memory clock frequency: 800 MHz).

On the other hand, when the secondary change is resumed in the steps S202 and S204 of FIG. 2, the controller 180 may increase the memory clock frequency changed in the step S200 by a frequency (20 MHz) corresponding to two times the source clock frequency to perform the secondary change (the secondarily changed memory clock frequency: 830 MHz). Nevertheless, when the secondary change is resumed through the steps S202 and S204 of FIG. 2, the memory clock frequency changed in the step S200 may be decreased by a frequency (20 MHz) corresponding to two times the source clock frequency to perform the secondary change (the secondarily changed memory clock frequency: 790 MHz).

On the other hand, due to the secondary change to the memory clock frequency, a frequency corresponding to the multiplication of the changed memory clock frequency may not correspond to a frequency of the communication frequency band currently used by the mobile terminal 100. In this case, since the communication frequency and the memory clock frequency do not interfere with each other, the controller 180 may of course not sense a change of communication performance of the mobile terminal 100.

FIG. 4 is a flowchart illustrating an operational process of allowing a mobile terminal according to an embodiment of the present disclosure to sense whether or not the communication performance of the terminal is degraded according to a frequency band of a currently connected communication network.

Referring to FIG. 4, when the step S202 of FIG. 2 starts, the controller 180 may acquire information on a frequency band of a communication network to which the mobile terminal 100 is currently connected, that is, a communication frequency band (S400). For an example, when the mobile terminal 100 is connected to a WiFi network in the Republic of Korea, the controller 180 may acquire information on a frequency band corresponding to 2,402 MHz to 2,484 MHz in the step S400.

Then, the controller 180 may determine whether or not the memory clock frequency changed in the step S200 of FIG. 2 or the memory clock frequency secondarily changed in the step S206 of FIG. 2 is included in the acquired frequency band (S402).

For an example, when the memory clock frequency changed in the step S200 of FIG. 2 is 810 MHz, the controller 180 may determine that the multiplication frequency of the memory clock frequency is included in the communication frequency band. When the memory clock frequency is 810 MHz, the triple frequency may be 2,430 MHz, and thus may be included in the communication frequency band.

When the multiplication frequency of the changed memory clock frequency is included in the communication frequency band as described above, the controller 180 may sense a change of communication performance after the memory clock frequency is changed (S404). Here, the change of communication performance may be sensed through the signal reception sensitivity or the signal-to-noise ratio as described above. Furthermore, the process may proceed to step S204 of FIG. 2 to determine whether or not the communication performance of the mobile terminal 100 has been degraded.

On the contrary, when the multiplication frequency of the changed memory clock frequency is not included in the communication frequency band, the frequency interference phenomenon does not occur, and thus the frequency of the currently changed memory clock may of course be maintained as it is. Accordingly, when the multiplication frequency of the changed memory clock frequency is not included in the communication frequency band as a result of the determination in the step S402, the controller 180 may terminate the operational process to maintain the currently changed memory clock frequency.

For example, when the memory clock frequency is changed to 800 MHz through the secondary change in the step S206 of FIG. 2, the triple frequency of the secondarily changed memory clock frequency may be 2,400 MHz. Therefore, it may deviate from the communication frequency band (WiFi frequency band) having a band between 2,402 MHz and 2,484 MHz. In this case, since the communication frequency band and the memory clock frequency do not interfere with each other, the degradation of communication performance may not occur. Therefore, when the step S202 of FIG. 2 is carried out again subsequent to the secondary change of the step S206 of FIG. 2, the controller 180 may terminate the operational process without sensing the degradation of communication performance in the step S402 to maintain the currently changed memory clock frequency.

On the contrary, when the memory clock frequency is changed to 820 MHz through the secondary change in the step S206 of FIG. 2, the triple frequency of the secondarily changed memory clock frequency may be 2,460 MHz. In this case, the secondary changed memory clock frequency may be included in the WiFi frequency band though the secondary change has been carried out.

On the other hand, even when the multiplication frequency of the memory clock frequency is included in the communication frequency band, an interference phenomenon may not actually occur. Accordingly, 2, when the step S202 of FIG. 2 is carried out again subsequent to the secondary change of the step S206 of FIG. 2, the controller 180 proceeds to the step S404 according to the determination result of the step S402 to sense a change of communication performance subsequent after the memory clock frequency is changed. Here, the change of communication performance may be sensed through the signal reception sensitivity or the signal-to-noise ratio as described above. Furthermore, the process may proceed to step S204 of FIG. 2 to determine whether or not the communication performance of the mobile terminal 100 has been degraded.

On the other hand, in the foregoing embodiment of the present disclosure, an example in which when the memory clock frequency is changed by an operational state of the mobile terminal 100, an application or the like, the memory clock frequency is secondarily changed only when the degradation of communication performance occurs irrespective of whether or not the changed frequency is included in the communication frequency band used by the mobile terminal 100 has been described.

However, on the contrary, the controller may of course determine whether or not the changed frequency is included in the communication frequency band used by the mobile terminal 100, and secondarily change the memory clock frequency according to the determination result, and determine whether or not the degradation of communication performance occurs for the secondarily changed memory clock frequency.

Figure 5:
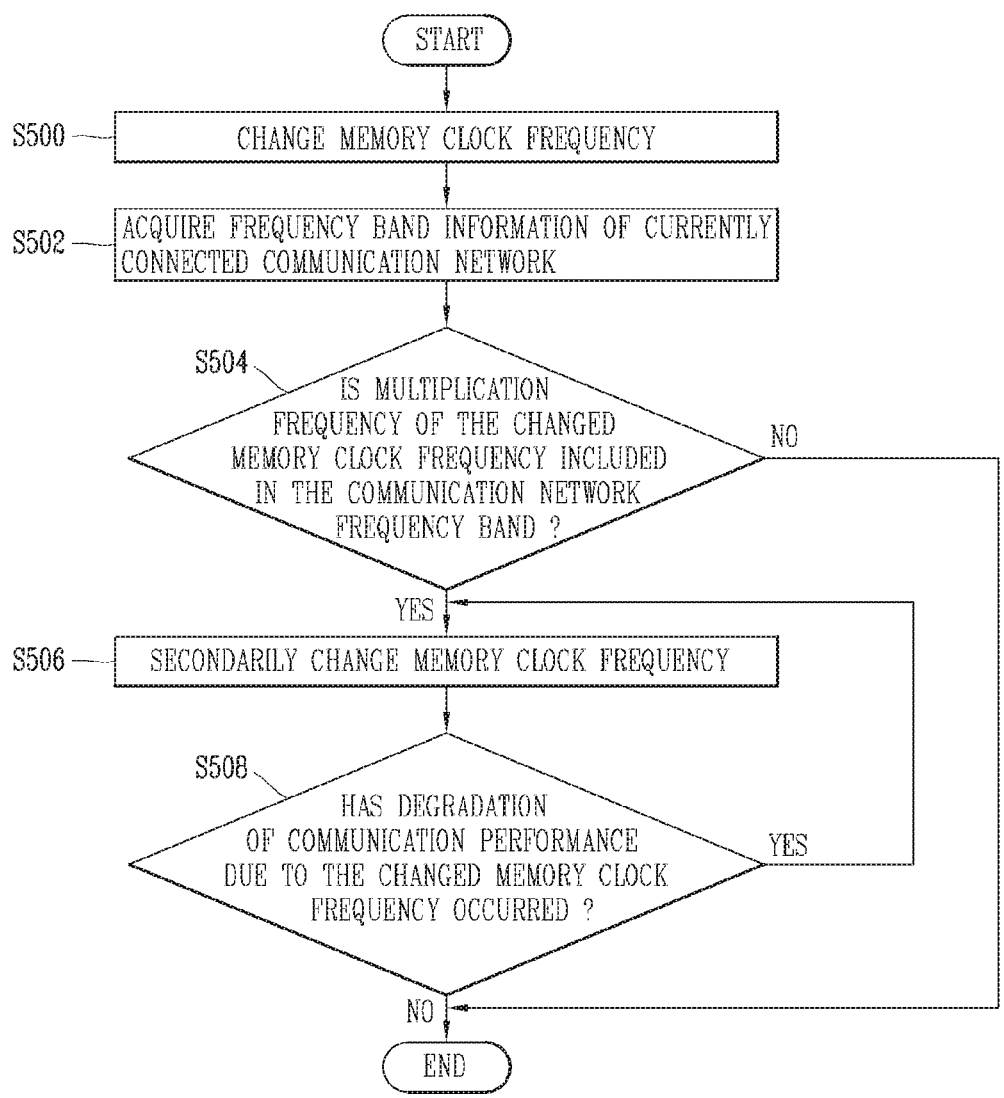
FIG. 5 is a flowchart illustrating an operational process of allowing a mobile terminal according to an embodiment of the present disclosure to secondarily change a memory clock frequency according to a frequency band of a communication network.

FIG. 5 is a flowchart illustrating an operational process of allowing the mobile terminal 100 according to an embodiment of the present disclosure to secondarily change the memory clock frequency according to the frequency band of the communication network.

Referring to FIG. 5, the controller 180 may change the memory clock frequency according to a current operational mode of the mobile terminal 100 or a function or application currently being performed (S500). Furthermore, the controller 180 may acquire information on the frequency band of a currently connected communication network, that is, a communication frequency band currently used by the mobile terminal 100 (S502).

On the other hand, when the information of the communication frequency band is acquired, the controller 180 may determine whether or not the multiplication frequency of the memory clock frequency changed in the step S500 is included in the communication frequency band currently used by the mobile terminal 100 (S504).

In addition, as a result of the determination of the step S504, when the memory clock frequency changed in the step S500 is not included in the communication frequency band currently used by the mobile terminal 100, the controller 180 may terminate the current operational process. In this case, the memory clock frequency changed in the step S500 may be maintained until the operational process of FIG. 5 is carried out again.

On the contrary, as a result of the determination of the step 504, when the memory clock frequency changed in the step S500 is included in the communication frequency band currently used by the mobile terminal 100, the controller 180 may secondarily change the memory clock frequency (S506).

Here, the secondary change for the memory clock frequency may be carried out similarly to the foregoing description of FIG. 3. In other words, the controller 180 may increase or decrease the memory clock frequency changed in the step S500 by a frequency corresponding to a preset multiple of the source clock frequency based on at least one of the current operational mode or the state of the mobile terminal 100 (for example, the remaining power state of the battery) to perform a secondary change for the memory clock frequency. Furthermore, the controller may determine whether or not the degradation of communication has occurred after the second change for the memory clock frequency is carried out (S508). Here, the degradation of communication performance may be determined based on whether or not the signal reception sensitivity or the signal-to-noise ratio is degraded as described above.

On the other hand, as a result of determination of the step S508, when the degradation of communication performance has not occurred, the controller 180 may terminate the current operational process. In this case, the secondarily changed memory clock frequency may be maintained until the operational process of FIG. 5 is carried out again.

However, as a result of the determination of the step S508, when the degradation of communication performance has occurred, the controller 180 may perform again the step S506 of secondarily changing the memory clock frequency. Therefore, when the secondary change of the memory clock frequency is carried out again according to the re-execution of the step S506, the step S508 may determine again whether or not the degradation of communication performance of the mobile terminal 100 has occurred after the secondary change of the memory clock frequency is carried out again. Furthermore, according to the determination result of the step S508, the controller 180 may terminate the current operational process or perform the process including the steps S506 to S508 again.

The effects of a mobile terminal according to the present disclosure and a control method thereof will be described as follows.

According to at least one of the embodiments of the present disclosure, the present disclosure may determine whether or not the degradation of communication performance of the terminal due to a changed memory clock frequency has occurred, and change the memory clock frequency again according to the determination result, thereby preventing the degradation of communication performance of the terminal.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. A mobile terminal, comprising:
   a memory configured to operate at a memory clock frequency corresponding to a first memory clock frequency; and
   a controller configured to:
   change the memory clock frequency to a second memory clock frequency according to at least an operational mode or one or more applications executed at the mobile terminal, wherein the second memory clock frequency is a multiple of the first memory clock frequency;
   determine whether a communication function at the mobile terminal is affected by the second memory clock frequency;
   change the memory clock frequency to a third memory clock frequency different from the second memory clock frequency when it is determined that the communication function is affected by the second memory clock frequency.

2. The mobile terminal of claim 1, wherein the controller is further configured to determine whether the operational mode prioritizes performance or power consumption reduction for changing the memory clock frequency to the second memory clock frequency.

3. The mobile terminal of claim 2, wherein:
   the second memory clock frequency is less than the first memory clock frequency when the operational mode prioritizes power consumption reduction; and
   the second memory clock frequency is greater than the first memory clock frequency when the operational mode prioritizes performance.

4. The mobile terminal of claim 1, wherein the memory clock frequency is decreased to the second memory clock frequency less than the first memory clock frequency when a remaining power of the mobile terminal is less than a preset level.

5. The mobile terminal of claim 4, wherein the controller is further configured to vary a frequency change width for changing the memory clock frequency when the memory clock frequency has been changed more than a preset number of times.

6. The mobile terminal of claim 1, wherein the controller is further configured to:
   determine whether the communication function at the mobile terminal is affected by the third memory clock frequency; and
   change the memory clock frequency to a fourth memory clock frequency different from the third memory clock frequency when it is determined that the communication function is affected by the third memory clock frequency.

7. The mobile terminal of claim 6, wherein the controller is further configured to increase or decrease the memory clock frequency by a different multiple of the first memory clock frequency corresponding to a number of times the memory clock frequency has been changed.

8. The mobile terminal of claim 1, wherein the controller is further configured to change the memory clock frequency to the second memory clock frequency when it is determined that the first memory clock frequency is included in a communication frequency band used by the mobile terminal.

9. The mobile terminal of claim 8, wherein the controller is further configured to change the memory clock frequency to the second memory clock frequency when it is determined that the communication function is affected by the first memory clock frequency included in the communication frequency band.

10. The mobile terminal of claim 1, wherein the controller is further configured to determine that the communication function is affected when a change is detected in:
    a wireless signal reception sensitivity of the mobile terminal; or
    a signal-to-noise ratio detected from a wireless communication unit of the mobile terminal.

11. The mobile terminal of claim 1, wherein an increase or decrease of frequency of the second memory clock frequency from the first memory clock frequency is based on a stored table comprising information for increase or decrease frequency amounts for the memory clock frequency.

12. A method for controlling a mobile terminal, the method comprising:
    a first step of changing a memory clock frequency of a memory operating at a preset memory clock frequency, wherein the preset memory clock frequency is changed to a changed memory clock frequency according to at least an operational mode or one or more applications executed at the mobile terminal;

a second step of determining whether a communication function at the mobile terminal is affected by the changed memory clock frequency;

a third step of changing the memory clock frequency again to another memory clock frequency different from the changed memory clock frequency when it is determined that the communication function is affected by the changed memory clock frequency; and repeating the second to third steps when the memory clock frequency is changed to the another memory clock frequency, wherein the another memory clock frequency is increased or decreased from the changed memory clock frequency by a preset multiple of the preset memory clock frequency.

13. The method of claim 12, further comprising determining whether the operational mode prioritizes performance or power consumption reduction for changing the memory clock frequency to the changed memory clock frequency.

14. The method of claim 13, wherein:
the changed memory clock frequency is less than the preset memory clock frequency when the operational mode prioritizes power consumption reduction; and
the changed memory clock frequency is greater than the preset memory clock frequency when the operational mode prioritizes performance.

15. The method of claim 12, wherein the memory clock frequency is decreased to the changed memory clock frequency less than the preset memory clock frequency when a remaining power of the mobile terminal is less than a preset level.

16. The method of claim 12, wherein a frequency change width for changing the memory clock frequency is varied when the memory clock frequency has been changed more than a preset number of times.

17. The method of claim 12, wherein the memory clock frequency is increased or decreased by a different multiple of the preset memory clock frequency for changing to the changed memory clock frequency, wherein the different multiple corresponds to a number of times the memory clock frequency has been changed.

18. The method of claim 12, wherein the memory clock frequency is changed from the preset memory clock frequency to the changed memory clock frequency when it is determined that the preset memory clock frequency is included in a communication frequency band used by the mobile terminal.

19. The method of claim 12, wherein determining that the communication function is affected comprises detecting a change in:
a wireless signal reception sensitivity of the mobile terminal; or
a signal-to-noise ratio detected from a wireless communication unit of the mobile terminal.

20. The method of claim 12, wherein an increase or decrease of frequency of the changed memory clock frequency from the preset memory clock frequency is based on a stored table comprising information for increase or decrease frequency amounts for the memory clock frequency.

* * * * *